United States Patent [19]

Cox

[11] 4,291,915
[45] Sep. 29, 1981

[54] COMBINED SUITCASE AND CHILD'S SAFETY SEAT

[76] Inventor: Jeanette Cox, 5548 Poplar Blvd., North Highlands, Calif. 95660

[21] Appl. No.: 33,445

[22] Filed: Apr. 26, 1979

[51] Int. Cl.³ .................... B60R 21/10; A47C 7/62; A45F 4/00
[52] U.S. Cl. ....................... 297/193; 190/8; 297/216; 297/250; 297/464; 297/468
[58] Field of Search .............. 190/8, 42; 297/193, 297/216, 250, 468, 464, 230, 231, 255, 256, 251, 252, 253, 192; 312/235 A; 280/801

[56] References Cited

U.S. PATENT DOCUMENTS

| | | | |
|---|---|---|---|
| 1,967,533 | 7/1934 | Koop | 297/250 X |
| 2,544,896 | 3/1951 | Nidetch et al. | 297/193 X |
| 2,875,816 | 3/1959 | Langefeld | 297/193 |
| 2,979,121 | 4/1961 | Gates | 297/255 |
| 3,136,579 | 6/1964 | Hunter | 297/250 |
| 3,388,947 | 6/1968 | Rosen | 297/464 X |
| 3,791,694 | 2/1974 | Roberts | 297/250 |
| 4,062,584 | 12/1977 | Pinkham et al. | 190/8 X |

FOREIGN PATENT DOCUMENTS 2031719 10/1978 United Kingdom ............... 297/193

Primary Examiner—James T. McCall
Attorney, Agent, or Firm—Lothrop & West

[57] ABSTRACT

A combined suitcase and safety seat provides an elevated surface upon which a child can comfortably and safely sit in an automobile. While in use as a safety seat, a flexible safety strap projects from opposite ends of the suitcase and is secured between the halves of the suitcase. The strap includes a loop on both ends and is of sufficient length to ensure that each loop extends outside the suitcase. The suitcase is closed and latched and is placed upon the automobile seat between the free ends of a seat belt. Each half of the seat belt is inserted through a respective belt loop, the child is placed upon the suitcase top, which is preferably cushioned, and the seat belt is then buckled over the child's lap. To use the device as a suitcase, the safety strap is disengaged from the seat belt and the suitcase is unlatched and opened to provide storage for the safety strap and other articles.

7 Claims, 3 Drawing Figures

COMBINED SUITCASE AND CHILD'S SAFETY SEAT

BACKGROUND OF THE INVENTION

Conventional seating provided in automobiles is primarily designed for adults. With respect to both the depth and relative height of the generally horizontal section of an automobile seat, adults rather than children have been provided for. A child cannot sit comfortably in a seat where the legs must be fully extended in a horizontal position. Further, owing to the relatively low seating position, the child cannot fully appreciate the view that the adult enjoys.

A further problem arises from the child's use of an automobile seat belt, again designed for use by an adult. Even assuming that a seat belt has been properly secured across a child's lap, the bilateral free play resulting from the design parameters gives little protection from a side thrust. Thus, both the seats and seat belts of modern automobiles give inadequate comfort and protection for children.

The prior art discloses a number of carrying bag and seat combinations. Hargraves, U.S. Pat. No. 1,767,925, illustrates a wicker basket which serves as both a carrier of goods and a seat. Viol, U.S. Pat. No. 3,297,119, shows a shoulder bag convertible into an infant's seat of the breeches-buoy type. A briefcase designed to be used as a backrest in conjunction with an existing seat can be seen in Chilewich, U.S. Pat. No. 3,876,247.

The present invention, however, is specifically intended to serve in a dual capacity, both as a suitcase and as a safety seat for a child. None of the prior art, as far as known, is specifically directed toward the use of existing automobile seat belts, in cooperation with a substantially conventional suitcase and a readily engageable adaptor, to provide a safety seat for children. It is felt that there has been a need for such a device, and that the present invention fulfills the demand in a straightforward, economical manner.

SUMMARY OF THE INVENTION

While the present invention can be used with virtually any suitcase of the hinged variety, certain modifications render the suitcase a safer and more comfortable seat upon which to sit. Comfort is attained by the addition of foam-like padding on one side of the suitcase. This padded side becomes the upper side and is the immediate sitting surface when the suitcase is laid down for use as a seat. The strength of this cushioned upper side is augmented by a system of intersecting ribs affixed to the lower surface of the upper side. The ribs provide resistance to any distortion in the suitcase side that might otherwise result from the weight of the child.

The transition from suitcase to safety seat begins by opening the hinged suitcase, whether conventional, or modified as described above, and laying a flexible, safety strap transversely across the opposing lateral sides of the lower compartment. Loops at both ends of the strap extend beyond the lateral sides so that when the suitcase is closed, the loops hang freely from the sides of the suitcase.

The safety strap can be a permanent feature of a specially modified suitcase by stitching or riveting the center portion of the strap to the floor of the lower compartment. The free ends of the strap can in this construction be folded back upon themselves, thereby rendering the strap unobtrusive while not in use. Slight indentations approximating the width and thickness of the safety belt can also be included in both opposite side edges of the lower compartment where the strap is to pass. These indentations remove unnecessary strain on the suitcase hinges when the upper and lower compartments are united. The permanent attachment of the safety strap assures that no lateral slippage can occur.

With the safety strap and loops properly in extended position and the suitcase latched, the suitcase is placed in horizontal attitude on an automobile seat between the free ends of an unhitched seat belt. Each free end of the seat belt is threaded through its respective loop. The child is then seated upon the upper padded side of the suitcase and the seat belt is latched across the child's lap. The child is now able to sit in an elevated position while being held securely by the seat belt. Since the seat belt is now working through the more confined dimension of the suitcase seat, it is considerably more effective in restraining lateral movement of the child. That is, the lateral free play heretofore existing in vehicle seat belts is largely eliminated. The child's legs can now comfortably drape over the forward portion of the suitcase. The suitcase latches and carrying handle are recessed to eliminate any discomfort or harm.

DETAILED DESCRIPTION OF PREFERRED EMBODIMENT

Figure 1:
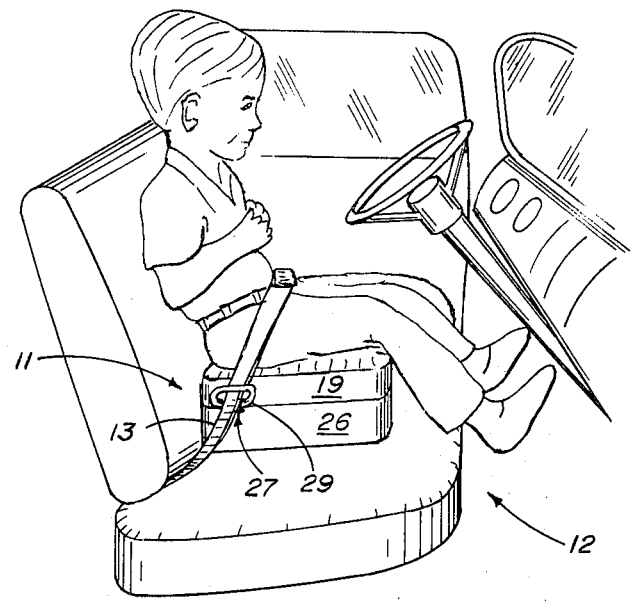
FIG. 1 is a perspective view of a preferred embodiment of the combined suitcase and child safety seat as installed in an automobile.

Turning now to the drawings, FIG. 1 shows the combined suitcase and child's safety seat 11 as it would be used in the front seat compartment 12 of a typical automobile. While specific details concerning the interconnection of the child's safety seat 11 and the vehicle's seat belt 13 will be discussed later, FIG. 1 depicts the dual-functioning embodiment of the invention in a general, operational aspect.

Figure 2:
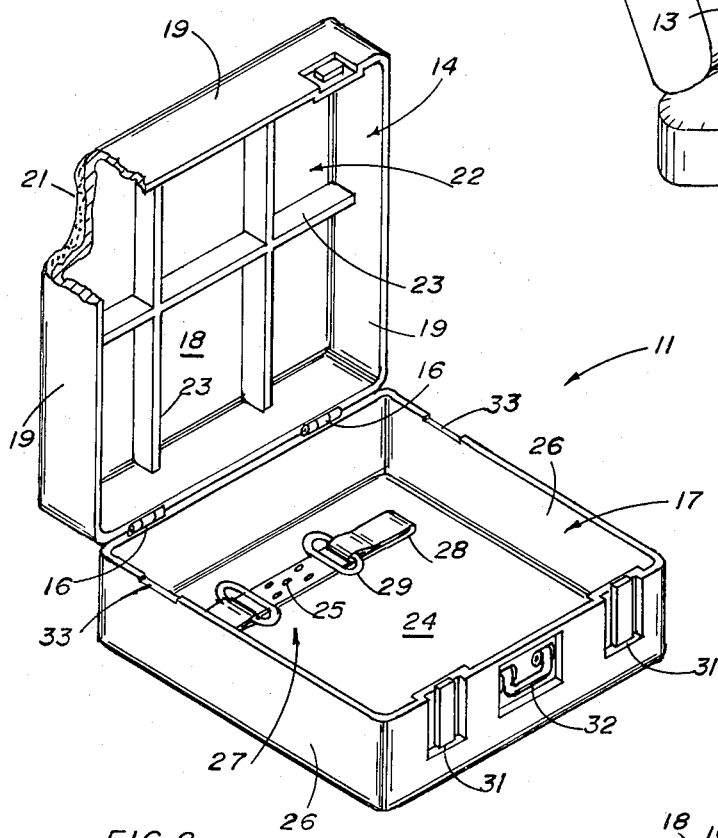
FIG. 2 is a perspective view with the hinged upper portion lifted open to show the system of ribbing and the safety strap in storage position, the upper compartment being partially broken away to show the padded cover; and, FIG. 3 is a perspective view of the suitcase in closed position, with the opposite portions of the seat belts threaded through the respective loops of the safety strap and the upper compartment partially broken away to show the shape that the permanently secured safety belt assumes when in use.

Particular details of construction are most clearly revealed in FIG. 2. The combined suitcase and seat 11 generally comprises an upper portion 14 or upper half, hingeably connected on one side by hinges 16 to a lower portion 17 or lower half.

The upper portion 14 includes a top 18 and four depending side walls 19. A cushioned cover 21 overspreads the outer surface of said top 18 and provides a comfortable surface upon which to sit. To provide reinforcement, a framework 22, or gridwork, is preferably added to the upper portion 14, the framework comprising a plurality of ribs 23 intersecting at right angles. The ribs 23 are attached to and project normally from the inner surfaces of the top 18 and the four depending side walls 19. The reinforcement framework 22 acts to prevent damaging distortion of the top 18 when weight is impressed thereon. The ribs 23 are of limited height to assure minimal reduction in the storage capacity of the combined suitcase and seat 11.

The lower portion 17 is formed by a bottom 24 and four upstanding side walls 26. A safety strap 27 comprises an elongated, flexible strip 28 of material, such as canvas or Nylon webbing, recurved upon itself and stitched at both ends to receive a pair of loops 29, or rings. The longitudinal midpoint of the strap 27 is affixed to the inner surface of the bottom 24 as by rivets 25 at a point slightly rearward, that is toward the hinges 16, from the center of the bottom 24.

The upper portion 14 and the lower portion 17 form, when closed, a receptacle defining an enclosed compartment for the secure storage of various articles.

When the device is in use as a suitcase, the safety strap 27 is folded back upon itself, as can be seen in FIG. 2. Clothes and other personal articles can thus be packed into the suitcase with the safety strap 27 taking up little room. A pair of suitcase latches 31 and a conventional carrying handle 32 are mounted within recesses on the side of the suitcase opposite that of the hinges 16. The latches 31 and the handle 32 are recessed to eliminate any discomfort and reduce the possibility of any injury which might result from sudden contact therewith.

Figure 3:
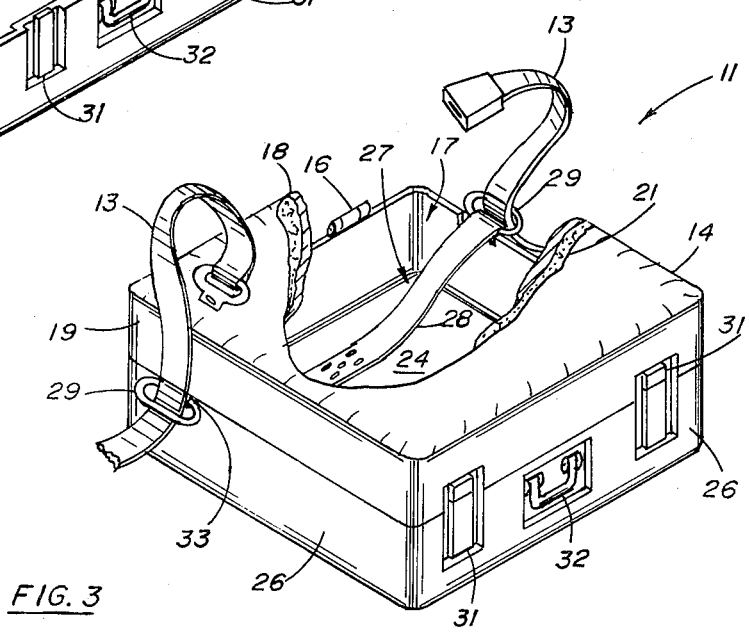

To adapt the suitcase for use as a child's safety seat, the latches 31 are opened and the upper half 14 of the suitcase is raised to expose the safety strap 27. Each end of the strap 27 is lifted and draped over the outside of the upright walls 26, as is most clearly shown in FIG. 3. Elongated horizontal apertures 33 are provided in the upper edge of the upright walls 26 to accommodate the elongated strap. The use of the apertures 33 permits easy closure of the latches 31 as the upper half 14 and the lower half 17 are again joined. The length of the elongated strap 27 is such that the loops 29 are now completely outside the seat 11 and the strap 27 is fully extended, as FIG. 3 illustrates. The suitcase is then closed and latched.

To install the device as a child's safety seat the suitcase with the exposed loops 29 is laid down on the horizontal portion of an automobile seat between the disconnected ends of the car's seat belt 13. Each free end of the belt 13 is inserted through its respective loop 29, as shown in FIG. 3. The child is then placed atop the safety seat 11 and the belt 13 is buckled across his or her lap. The child can now sit comfortably in an elevated position with the security of a safety belt.

The loops 29 cooperate with the upper surface of the safety seat to reduce and restrict the effective lateral dimension of the car's seat belt 13. That is to say, the car's seat belt 13 is now able to act more effectively for a child because lateral "free play" has largely been eliminated. Thus the present invention has the additional advantage of making seat belts designed for adults also effectual for use by children.

When no longer needed, the car's seat belt 13 is uncoupld and disengaged from the loops 29. The safety strap 27 can then be returned to storage in the suitcase, thereby completing the transition from child's safety seat to suitcase.

Although the safety seat of the invention as disclosed in the preferred embodiment is shown as a conventional suitcase, it is to be understood that applicant's invention is not to be limited thereto, but rather embraces a multitude of shapes or forms which would be apparent to one skilled in the art.

What is claimed is:

1. A combined suitcase and child's safety seat for use with a conventional vehicle seat belt comprising:
   a. a receptacle having a bottom and a vertically spaced top substantially parallel to said bottom, vertical side walls and end walls being interposed between and interconnecting the periphery of said bottom and said top, said side walls and end walls being disjoined through a plane substantially parallel to said top and spaced substantially equidistant from said top and said bottom to form an upper portion and a lower portion, said upper and lower portions being hingeably connected on one side so as to permit opening and closure of said receptacle, and latching means to secure together said upper and lower portions of said receptacle;
   b. a safety strap comprising an elongated, flexible strip including a loop at each end thereof, said strip being extended and inserted between said upper and lower portions of said receptacle prior to closure, said strip being of sufficient length so that said loops are located outside the opposite end walls of said receptacle to receive the respective free ends of the seat belt when said receptacle is closed, said loops securing said receptacle to said seat belt as said seat belt is extended over the child's lap and buckled.

2. A combined suitcase and child's safety seat as in claim 1 wherein said safety strap is affixed at its approximate midpoint to the upper surface of said bottom.

3. A combined suitcase and child's safety seat as in claim 2 wherein a recess is provided in each of the opposite edges of said end walls of one of said portions of said receptacle to permit the respective free end of said strap to pass therethrough.

4. A combined suitcase and child's safety seat as in claim 1 wherein the upper surface of said top is provided with a layer of cushioning material.

5. A combined suitcase and child'safety seat as in claim 3 wherein the lower surface of said top is provided with a network of reinforcing ribs intersecting at right angles and spanning said end walls and side walls.

6. A combined suitcase and child's safety seat as in claim 1 wherein a carrying handle is provided for the convenient handling of said receptacle.

7. A combined suitcase and child's safety seat as in claim 6 wherein said latching means and said carrying handle are recessed into one of said side walls to present a substantially flush outer surface devoid of protuberances.

* * * * *